(12) United States Patent
Champion (10) Patent No.: US 6,377,282 B1
(45) Date of Patent: Apr. 23, 2002

(54) COMBINING IMAGES AND CONTROLLING A CURSOR WHEN IMAGES ARE COMBINED

(75) Inventor: Mark A. Champion, Kenmore, WA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/268,561

(22) Filed: Mar. 15, 1999

(51) Int. Cl.[7] .................................................. G06F 3/00
(52) U.S. Cl. ......................... 345/726; 345/716; 345/856
(58) Field of Search ............................... 345/302, 435, 345/113, 327, 330, 332, 145, 339, 157, 629, 726, 716, 753, 759, 856; 709/204, 205; 707/500.1

(56) References Cited

U.S. PATENT DOCUMENTS

| 5,506,954 A | 4/1996 | Arshi et al. ................. 395/162 |
| 5,574,934 A | 11/1996 | Mirashrafi et al. .......... 395/800 |
| 5,587,928 A | * 12/1996 | Jones et al. ................. 709/204 |
| 5,793,367 A | * 8/1998 | Taguchi ...................... 345/330 |
| 5,794,018 A | 8/1998 | Vrvilo et al. ................ 395/551 |
| 5,859,979 A | 1/1999 | Tung et al. ............. 395/200.58 |
| 6,202,212 B1 | * 3/2001 | Sturgeon et al. ............ 725/141 |

FOREIGN PATENT DOCUMENTS

WO    WO97/50242    12/1997

* cited by examiner

*Primary Examiner*—John Cabeca
*Assistant Examiner*—Kieu D. Vu
(74) *Attorney, Agent, or Firm*—Skjerven Morrill MacPherson LLP; Michael Shenker (57) ABSTRACT

In a video conferencing system, a video overlay system (160) generates a motion video signal (MV). The motion video signal incorporates an image received from a remote video conferencing system (110.2) and from a local camera (186). The video overlay system also receives a computer video signal (CV) from a local computer (140). A summing amplifier (310) in the video overlay system generates an output signal (SV) representative of the sum of the computer video signal and the motion video signal. The output signal (SV) is provided to a monitor (174) when motion video is to be displayed. Use of the summing amplifier allows a cursor (240) generated by the computer to be inserted into the motion video on the monitor screen.

25 Claims, 6 Drawing Sheets

COMBINING IMAGES AND CONTROLLING A CURSOR WHEN IMAGES ARE COMBINED

BACKGROUND OF THE INVENTION

The present invention relates to combining of images and to controlling a cursor when images are combined.

Some computer systems combine images. An example is a computer-based video conferencing system 110.1 shown in FIG. 1. System 110. 1 is of type VMU-1000 (Trademark) available from Sony Electronics Inc. of San Jose, Calif. System 110.1 allows human user 120.1 to conduct a video conference with two other users shown at 120.2. Users 120.2 use video conferencing system 110.2 which may be identical to or different from the system 110.1.

Figure 1:
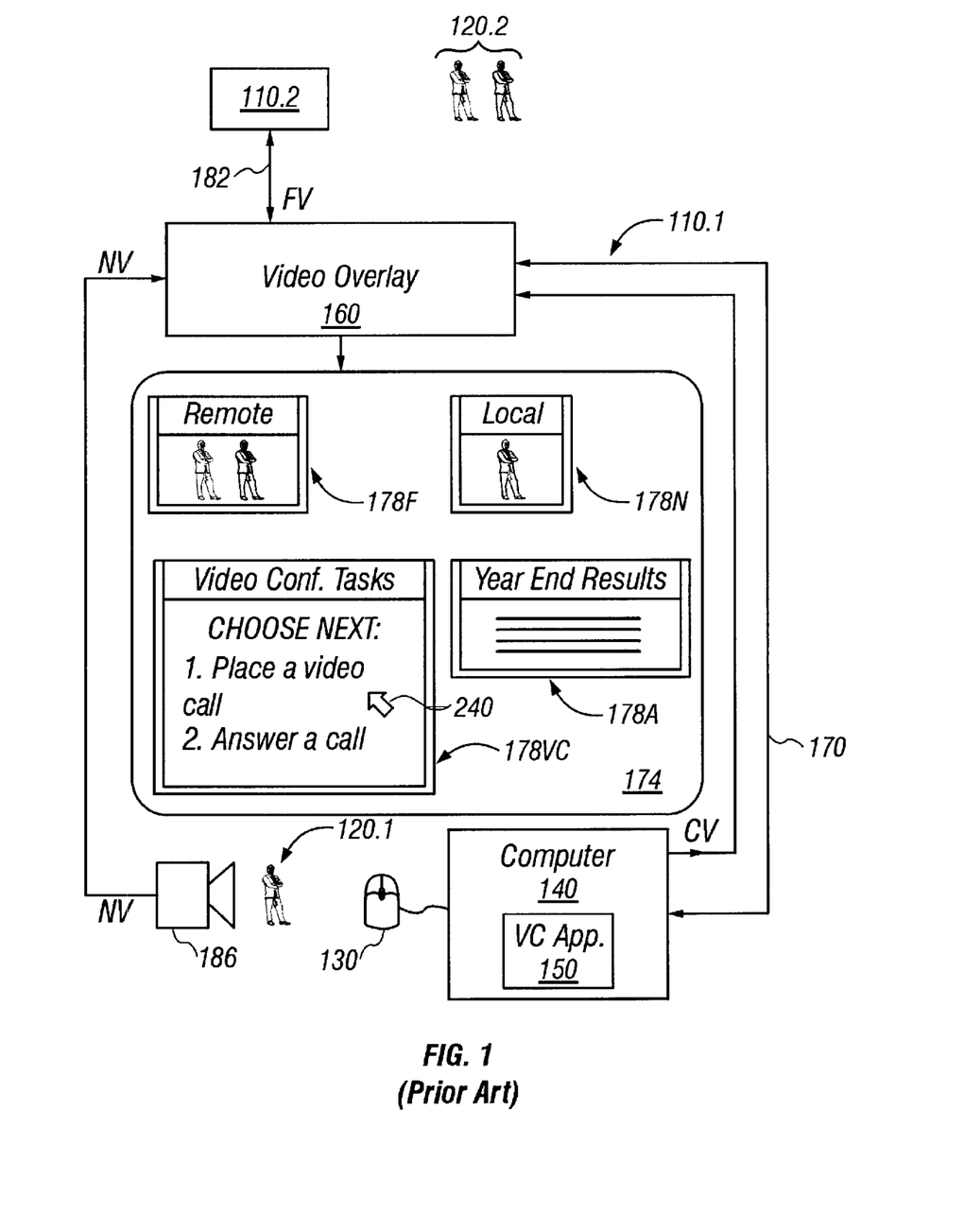
FIG. 1 is block diagram of a prior art video conferencing system.

User 120.1 controls the system 110.1 with a mouse 130 connected to computer 140. Computer 140 executes a video conferencing software application 150. Under the control of this application, the computer exchanges control signals with video overlay system 160 over a link 170. Video overlay system 160 also receives from computer 140 an analog signal CV for display on monitor 174. The analog signal incorporates a window 178VC generated by application 150. Window 178VC includes a menu of choices for user 120.1. The signal CV also incorporates a window 178A generated by some other application (not shown) executed by computer 140, for example, a spreadsheet.

Video overlay system 160 also receives a remote video ("far-side video") signal FV from system 110.2 over a telephone link 182. (In addition, system 110.1 receives an audio signal from system 110.2. The audio signal is demultiplexed and processed by another portion (not shown) of system 110.1.)

The video signal FV incorporates an image displayed in window 178F on monitor 174.

Video overlay system 160 receives a local video ("near-side video") signal NV from camera 186 which is part of system 110.1. Video overlay system 160 sends the near-side video to system 110.2 over telephone link 182. (The local audio is sent out over the same link.)

If desired, the local video image carried by signal NV is displayed on monitor 174 in window 178N.

Figure 2:
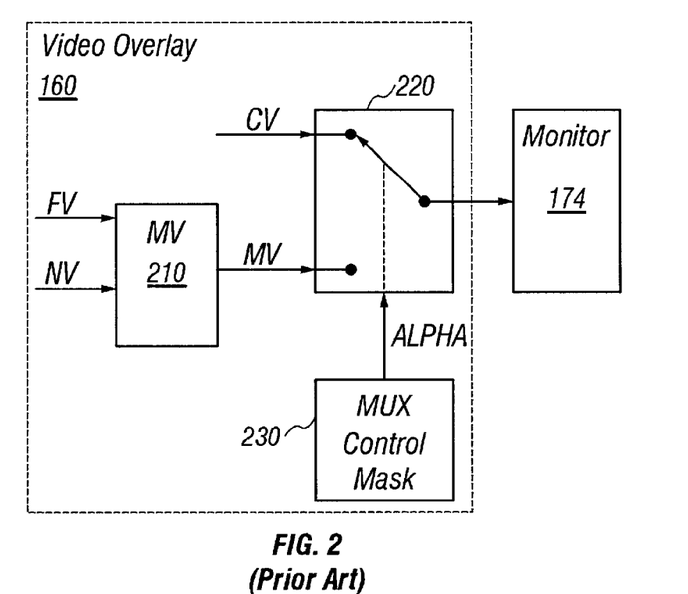
FIG. 2 is a block diagram of a portion of a video overlay system of the system of FIG. 1.

FIG. 2 illustrates a portion of video overlay system 160. Motion video block 210 receives far-side and near-side signals FV, NV ("motion video signals") and generates an analog signal MV incorporating the far-side and near-side images. Video switch 220 selects either the signal MV or the computer video signal CV. The output of video switch 220 controls an electron beam (not shown) in CRT monitor 174. When the beam traces the monitor screen areas in which the computer video is to be displayed (computer video is the image generated by computer 140, including the windows 178VC, 178A in FIG. 1), the switch 220 selects the signal CV. When the F g beam traces the areas in which the motion video is to be displayed (the motion video includes the far-side and near-side images in windows 178F, 178N), the switch selects the motion video signal MV.

Video switch 220 is controlled by select signal ALPHA generated by multiplexor control mask 230. Multiplexor control mask 230 includes a memory (not shown) storing a 1 or a 0 for each group of pixels in monitor 174. These 0's and 1's are read out of the memory to generate the select signal ALPHA. See PCT application WO 97/50242 "System and Method for Overlay of a Motion Video Signal on an Analog Video Signal" published Dec. 31, 1997.

The signal CV incorporates cursor 240 (FIG. 1). The cursor is generated by computer 140 in response to signals from mouse 130. The cursor helps the user 120.1 to control the system 110.1.

It is desirable to make the cursor more convenient to use.

SUMMARY

The inventor has observed that when the mouse moves the cursor into the motion video, the cursor disappears and the user becomes disoriented. The cursor disappears because the motion video is constructed from the signal MV and the signal MV does not incorporate the cursor.

In some embodiments of the present invention, the cursor is incorporated into the motion video. In some embodiments, the motion video signal MV is combined with the computer video signal CV. For example, in some embodiments, MV is summed with CV, and the motion video is constructed using the sum signal. Therefore, if the mouse moves the cursor into the motion video, the cursor is displayed in the motion video.

In some embodiments, when MV carries the motion video, the signal CV=0 (CV is black for RGB embodiments) except for the cursor. Therefore, the motion video is not degraded.

The present invention is not limited to video conferencing or to motion video. Some embodiments combine non-video-conferencing signals that incorporate images. One or more of these signals are generated by a system capable to incorporate a cursor into an image. At least a portion of the cursor can be combined with another image.

Other features and advantages of the invention are described below. The invention is defined by the appended claims.

DESCRIPTION OF THE PREFERRED EMBODIMENT(S)

Figure 3:
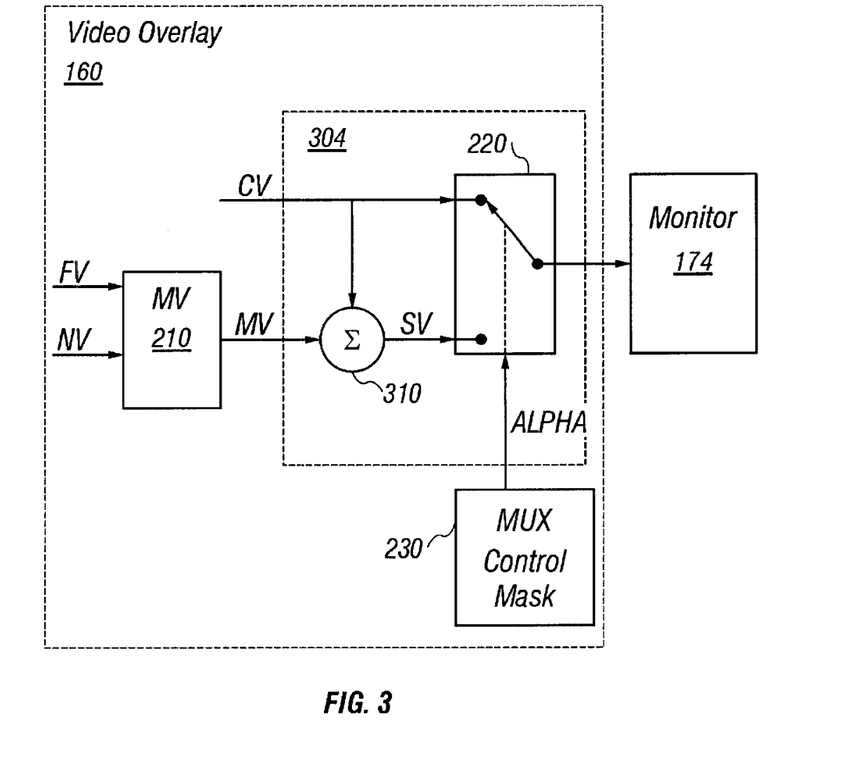
FIG. 3 is a block diagram of a portion of a video overlay system according to the present invention.

FIG. 3 illustrates a modification of video overlay system 160 which enables the cursor to be displayed in motion video images in windows 178F, 178N. Signals CV and MV are inputs to a block 304. In block 304, video summing amplifier 310 sums (adds) the motion video signal MV with computer video signal CV and generates a signal SV representative of the sum CV+Mv. (In some embodiments, SV is not exactly equal to CV+MV. For example, in some embodiments, amplifier 310 limits SV to a maximum value.) Video switch 220 selects the signal SV instead of MV when signal ALPHA selects the motion video. When signal ALPHA selects the computer video, the video switch selects CV as in FIG. 2. Use of SV allows the cursor to be displayed in motion video images.

In some embodiments, when signal ALPHA selects SV, signal CV is zero except in the cursor area. Therefore, signal CV does not degrade the motion video image.

Figures 4A, 4B:
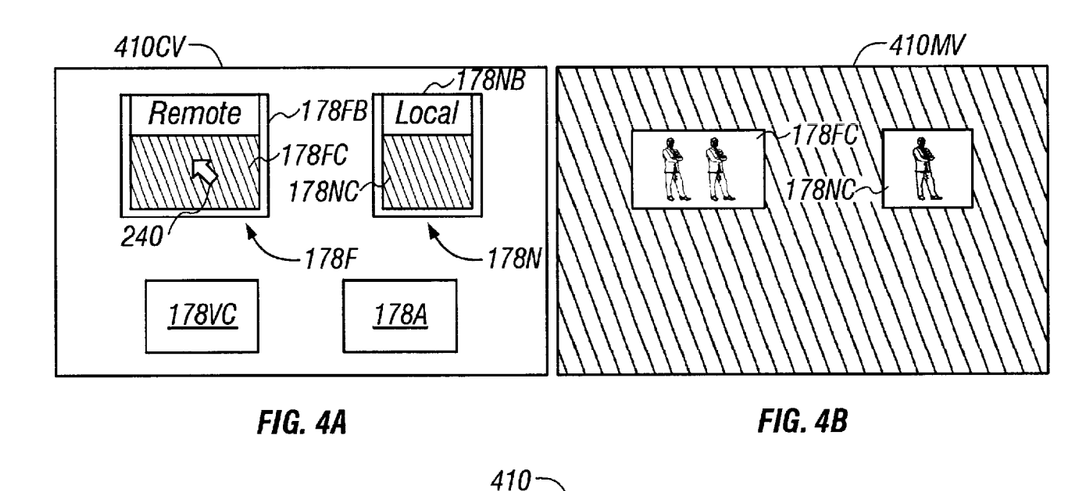
FIGS. 4A–4C illustrate images generated by the system of FIG. 3.
Figure 4C:
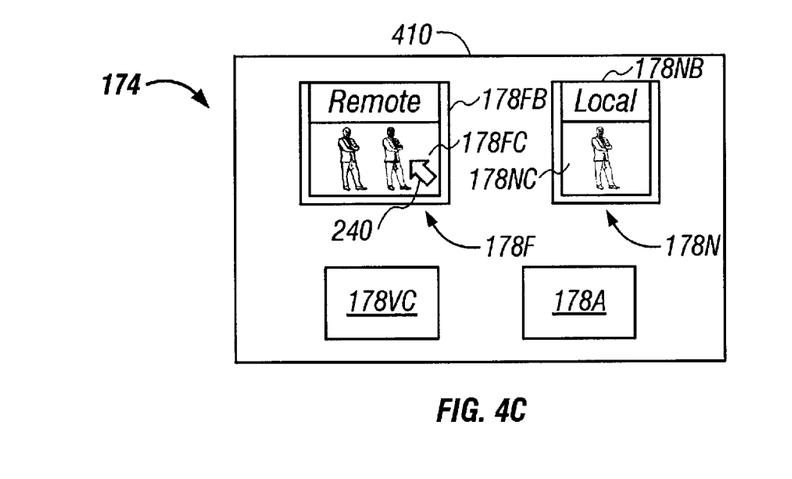

FIG. 4A illustrates an image 410CV carried by the signal CV in one embodiment. FIG. 4B illustrates an image 410MV carried by signal MV. FIG. 4C illustrates the resulting image 410 on monitor 174. Far-side video window 178F includes an area 178FC in which the far-side image is displayed. Window 178F also includes a title-bar and border area 178FB. We will call the area 178FC "client area" following the Microsoft Windows (Trademark) terminology. See Charles Petzold, *Programming Windows®* 95 (1996), incorporated herein by reference. (The invention is not limited to Microsoft Windows, however.)

As shown in FIG. 4A, the title-bar and border area 178FB is displayed by video conferencing application 150, and thus is incorporated into signal CV. The client area 178FC is filled with a color corresponding to a zero value of the signal CV. In some embodiments, the signals CV and MV are in RGB format, and that color is black. In some Windows® 95 embodiments, application 150 fills the client area with black by specifying the black color as the background color for window 178F, using well known system calls. See *Programming Windows®* 95 cited above.

The cursor 240 is incorporated into signal CV, as in prior art. In FIGS. 4A, 4C, the cursor is in area 178FC. In some Windows® 95 embodiments, the cursor is incorporated into the signal CV by the operating system. Application 150 runs on top of the operating system.

Similarly, near-side window 178N includes client area 178NC in which the near-side image is displayed in FIG. 4C. Window 178N also includes a title-bar and border area 178NB. Area 178NB is displayed by application 150, as shown in FIG. 4A. Client area 178NC is filled by application 150 with a suitable color which corresponds to the zero value of signal CV (black color for RGB video). If the cursor 240 moves into area 178NC, the cursor will overlay the area 178NC in image 410CV.

The remaining windows 178, such as windows 178VC, 178A, are incorporated into signal CV (FIG. 4A).

In motion video image 410MV (FIG. 4B), the far-side image is in client area 178FC, and the near-side image is in client area 178NC. The rest of motion video image 410MV incorporated into signal MV in the embodiment of FIG. 3 is "don't care". In some embodiments, the rest of image 410MV corresponds to MV=0 (black for RGB).

Table 1 below shows operations performed by application 150 in some embodiments.

TABLE 1

1. Enable the cursor display.
2. Display video conferencing application windows such as window 178VC in FIG. 1.
3. Display far-side window 178F and near-side window 178N. Fill the areas 178FC, 178NC with black color. Use link 170 to inform video overlay system 160 of the position of client areas 178FC, 178NC. In response, the video overlay system 160 will: (1) place the far-side and near-side images into respective areas 178FC, 178NC in the video overlay system's video buffer 490 (FIG. 7); and (2) write appropriate values to multiplexor control mask 230 to ensure a proper select signal ALPHA for the video switch 220. See PCT application WO 97/50242 "System and Method for Overlay of a Motion Video Signal TABLE 1-continued on an Analog Video Signal" (Sony Electronics Inc., published 31 December 1997) incorporated herein by reference.
4. If any window gets resized (in response to the user input, for example), or any window gets closed, or a new window is open, so that the position of areas 178FC, 178NC changes, inform video overlay system 160 over the link 170. Also inform the video overlay system if any area 178FC, 178NC gets overlaid by any window. In response, the video overlay system 160 will update the multiplexor control mask 230 memory as needed.
5. If the far-side image area 178FC takes the full screen of monitor 174 ("full-screen mode"), then on any cursor movement, re-display a video conference window such as window 178VC. If the cursor does not move for a predetermined length of time, remove the video conferencing window. The cursor remains visible at all times.

Figure 5:
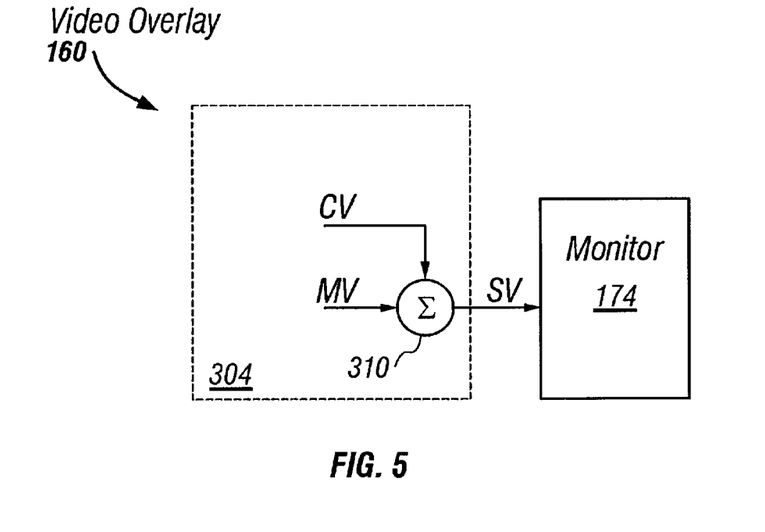
FIG. 5 is a block diagram illustrating a portion of another video overlay system according to the present invention.

FIG. 5 illustrates another embodiment of block 304 of video overlay system 160. Video switch 220 is omitted. Monitor 174 is driven by the output SV of summing amplifier 310. Multiplexor control mask 230 is omitted from system 160.

Figure 7:
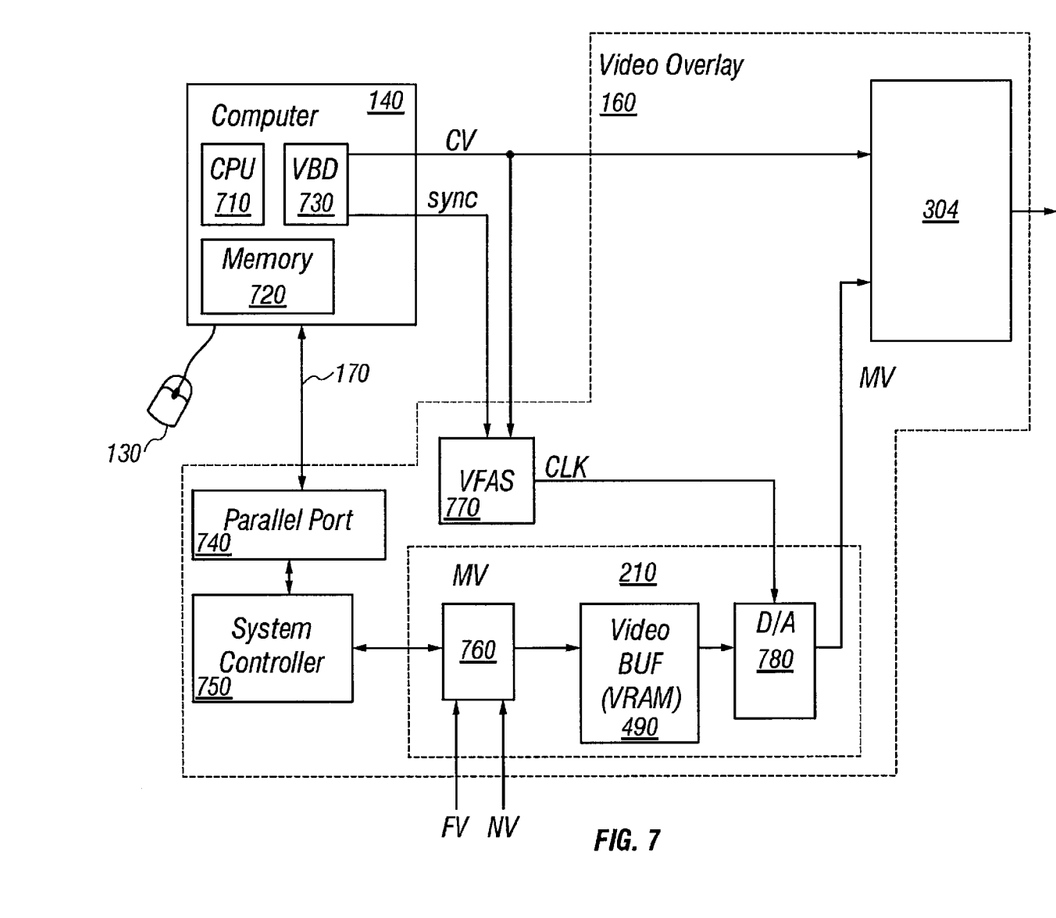
FIG. 7 is a block diagram of a video conferencing system according to the present invention.

For the embodiment of FIG. 5, video overlay system 160 causes MV=0 outside motion video areas 178FC, 178NC. In RGB embodiments, MV=0 means black color. MV is set to 0 by writing appropriate portions of video buffer 490 (FIG. 7).

Figure 6A:
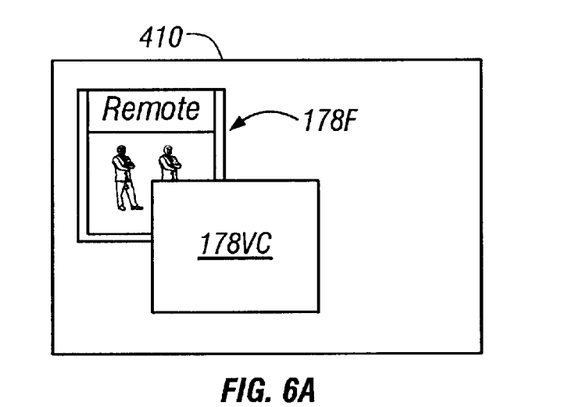
FIGS. 6A and 6B illustrate images generated according to the present invention.
Figure 6B:
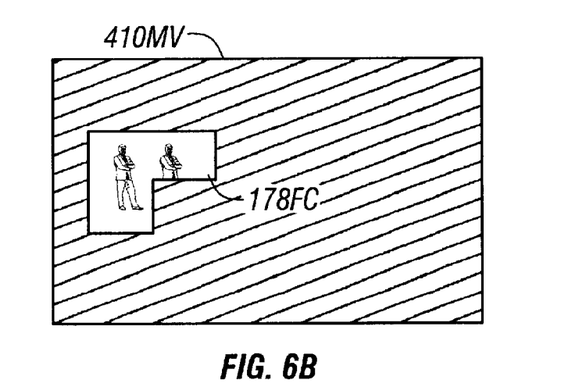

FIG. 6A illustrates an image 410 in which the video conferencing window 178VC overlays the far-side image area 178FC. FIG. 6B shows the corresponding motion video image 410MV. In image 410MV, the overlaid portion of area 178FC is painted black by the video overlay system.

Motion video windows 178F, 178N can also overlay each other. In this case, the overlaid portion is not painted black but is painted with the far-side or near-side image as appropriate.

The embodiments of FIGS. 3 and 5 also allow the cursor to be positioned so that part of the cursor is in motion video area 178FC or 178NC and part of the cursor is outside the motion video area, and/or so that part of the cursor is in area 178FC and part of the cursor is in area 178NC.

FIG. 7 illustrates other components of one embodiment of system 110.1. Computer 140 includes a processor (CPU) 710, a memory 720, and a video board 730. Video board 730 generates the signal CV. The video board also generates a signal "sync" which consists of the horizontal and vertical sync signals described in the aforementioned PCT application WO 97/50242.

Link 170 connects a parallel port of computer 140 to parallel port 740 of video overlay system 160. Parallel port 740 is connected to system controller 750 in system 160. The system controller is a microprocessor. System controller 750 controls motion video block 210.

In motion video block 210, logic block 760 receives the digital signals FV, NV. One or both of the digital signals carry compressed video in some embodiments. Logic block 760 decompresses the signals if needed, converts them to digital RGB format if needed, and writes the resulting digital RGB data to video buffer 490 areas corresponding to client areas 178FC, 178NC. The remaining portions of video buffer 490 are written with black video. Video buffer 490 is a video random access memory (VRAM) in some embodiments.

Video format analyzer and synchronizer (VFAS) 770 receives the sync signals from computer 140 and also receives at least one component (red, green or blue) of the signal CV. VFAS 770 generates a digital clock signal CLK synchronized with the signal CV. Digital-to-analog converter 780 reads the digital image 410MV from the video buffer 490 synchronously with clock CLK and converts the digital image to the analog signal MV. See the aforementioned PCT application WO 97/50242.

The embodiments of video overlay system 160 include systems VMU-1100 (Trademark) available from Sony Electronics Inc. and described in "Digital Meeting™ System; Operating Instruction; VMU-1100SU Single Use, VMU-1100SD Single User Deluxe, VMU-1100SG Small Group" (Sony Electronics Inc. 1999), incorporated herein by reference. Also available from Sony Electronics Inc. is a video conferencing application 150 for the VMU-1100 video overlay system.

Figure 8:
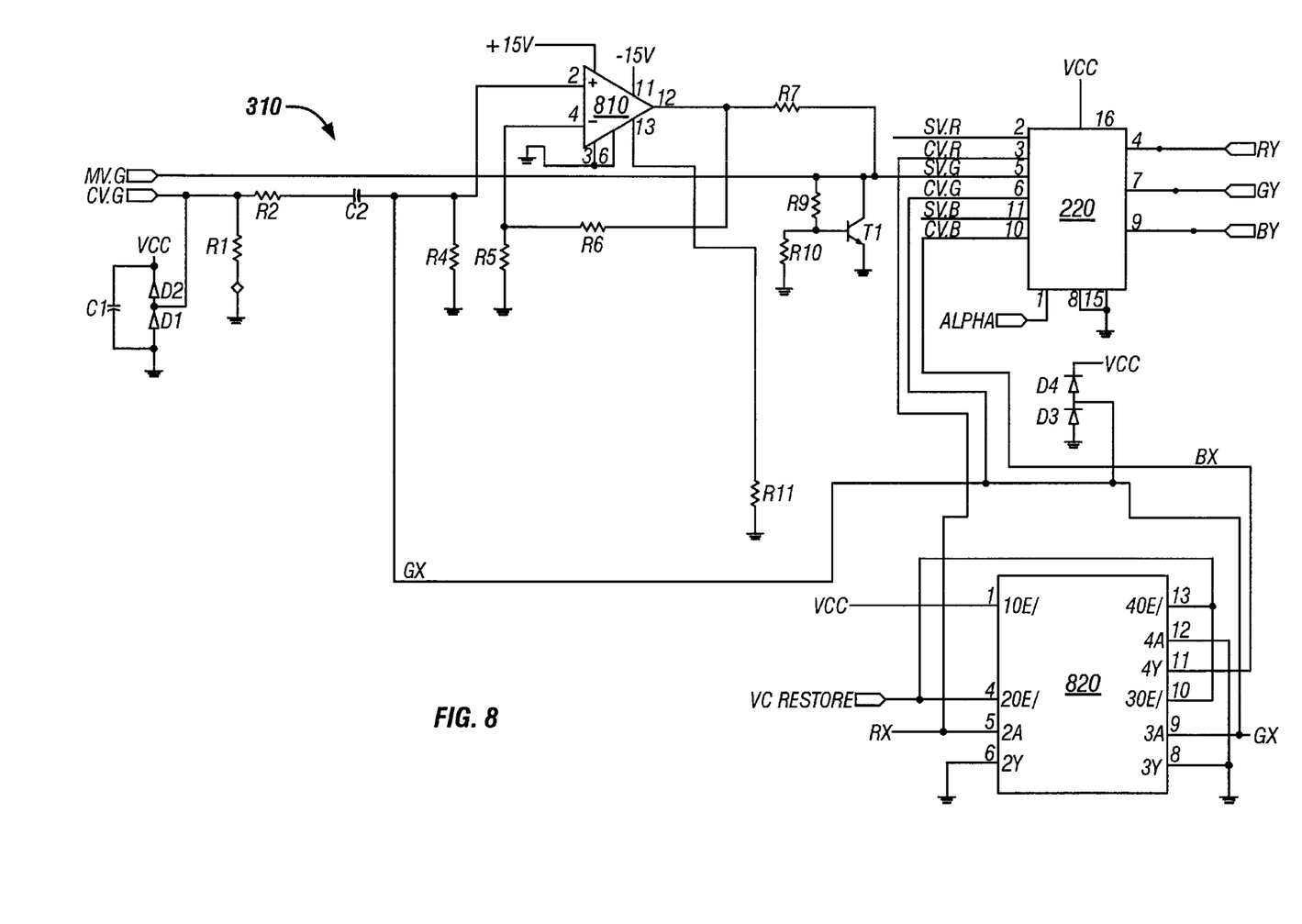
FIG. 8 is a circuit diagram of a portion of the video overlay system of FIG. 3.

FIG. 8 shows one embodiment of summing amplifier 310 and video switch 220 of FIG. 3 for the case when the signals CV, MV are RGB signals. The red, green, and blue components of the signal MV are shown respectively as MV.R, MV.G, and MV.B. The red, green and blue components of signal CV are shown respectively as CV.R, CV.G, and CV.B. The red, green and blue components of signal SV are shown respectively as SV.R, SV.G, and SV.B. Only the circuitry for the green components MV.G, CV.G, SV.G is shown in detail. The circuitry that processes the red and blue components is identical to the circuitry for the green components.

The circuitry of FIG. 8 has an operating range of up to about 135 MHz, as appropriate for video signals in some embodiments.

Summing amplifier 310 includes operational amplifier 810 for summing the green components Mv.G, CV.G. Amplifier 310 is implemented by part LT1260 available from Linear Technology of Milpitas, Calif. That part contains three operational amplifiers. The other two operational amplifiers (not shown) are used for the red and blue components of video amplifier 310.

Video switch 220 is part QS4A205Q available from Quality Semiconductor of Santa Clara, Calif. Pin 6 of the switch receives a version of signal CV.G. This version is also shown as GX if FIG. 8. Pin 6 is connected to the input signal CV.G through resistor R2 and capacitor C2. Pin 5 receives the sum signal SV.G. Similarly, pin 3 of video switch 220 receives a version of signal CV.R (also shown as RX), and pin 2 receives SV.R. Pin 10 receives a version of CV.B (also shown as BX), and pin 11 receives SV.B. The signal BX is also provided to VFAS 770 (FIG. 7) to enable the video overlay system to detect active video, as described in the aforementioned PCT application WO 97/50242.

Bipolar transistor T1 (part no. 2SC2412KS) and resistors R9 and R10 limit the signal SV.G to a maximum value slightly above 0.7V. This is done because the video signals provided to monitor 174 are voltages in the range of about 0 to 0.7V, but the sum CV.G+MV.G can significantly exceed the upper voltage limit of 0.7V. For example, if the cursor is white and is laid over white motion video, the sum CV.G+MV.G may be twice the upper voltage limit, which might lead to undesirable artifacts (smearing) on the screen of monitor 174. Yet signal SV is representative of the sum CV+MV.

In switch 220, pin 1 receives the signal ALPHA (FIG. 3). Pins 8 and 15 are grounded. Pins 4, 7 and 9 provide respective red, green and blue output voltages RY, GY, BY to monitor 174.

Switch 820 is used to restore the ground level on nodes RX, GX, BX during the back porch of signal CV. Switch 820 is a quad switch QS3125S1 from Quality Semiconductor of Santa Clara, Calif. The control signal DC_RESTORE is asserted during the back porch, closing the individual switches in quad switch 820. As a result, pin 9 (node GX) becomes connected to pin 8 (ground). Nodes RX and BX become grounded in a similar way.

Other parts in FIG. 8 are described in the following Table 2:

TABLE 2

| Part | Description |
|---|---|
| Capacitor C1 | 0.1 μF |
| Capacitor C2 | 1 μF |
| Diodes D1, D2 | These two diodes are implemented by a single part BAV99LT1 from Motorola of Milpitas, California. Diodes D1 and D2 and capacitor C1 protect the amplifier 310 from overly high voltages. |
| Resistor R1 | 75 ohm |
| Resistor R2 | 10 ohm |
| Resistor R4 | 15K |
| Resistor R5 | 1.5K |
| Resistor R6 | 1.5K |
| Resistor R7 | 75 ohm |
| Resistor R9 | 75 ohm |
| Resistor R10 | 220 ohm |
| Resistor R11 | 4.7K |
| Diodes D3, D4 | These two diodes are implemented by a single part BAV99LT1 from Motorola. Diodes D3 and D4 protect against large variations of voltage supply VCC (VCC is 5.0 V in some embodiments). |

VCC is also connected to ground through three capacitors (not shown) connected in parallel, each having a capacitance of 0.1 μF.

The above embodiments illustrate but do not limit the invention. In particular, the invention is not limited to any particular circuitry. The invention is not limited to RGB or any other format of analog or digital signals. In particular, some embodiments use the YUV or some other format for analog signals CV, MV. The invention is not limited to analog signals, to voltage signals, or to any voltage levels. In some embodiments, the signal CV is not zero in motion video areas 178FC, 178NC. The invention is not limited to any particular computer 140 or any particular computer architecture, or to using a computer. The invention is not limited to any particular operating system. Some embodiments use an operating system available from Apple Computer, Inc. of Cupertino, Calif., or some other operating system. Other embodiments do not use an operating system. The invention is not limited to any particular video conferencing application. In some embodiments, all or part of the video conferencing application is implemented with hardware without software. Further, the invention is not limited to video conferencing. In some embodiments, images are combined that do not relate to video conferencing. Among the images being combined, one or more images are generated by a system that can control a cursor. The cursor is capable to be displayed in other images. The invention is not limited to summing of the signals CV and MV. In some embodiments, CV or MV are subtracted (e.g. to obtain MV−CV), or some other processing is done to combine the signals to enable the cursor to be displayed in the motion video.

The invention is not limited to use with motion video images, that is, images that are allowed to move as in video conferencing applications. In some embodiments, one or more of signals NV, FV, SV and MV may contain static images.

The invention is not limited by a mouse. In some embodiments, a track ball or some other device is used to control a cursor.

Further, the invention is not limited to any particular way of displaying the cursor. In some embodiments, the cursor position is provided to video overlay system 160 over link 170, and the cursor is generated by the video overlay system. The invention is not limited to link 170 connected to parallel ports of computer 140 and video overlay system 160. In some embodiments, link 170 interconnects serial ports of the computer and the video overlay system. Some embodiments omit link 170; the control signals between the computer and the video overlay system are transmitted over a video channel over the same physical media as computer video signal CV. Other embodiments and variations are within the scope of the invention, as defined by the appended claims.

What is claimed is:

1. A method for generating a combined image signal carrying a combined image occupying at least a first area and a second area, the method comprising:

receiving a first image signal that carries a first image comprising a first portion in the first area and a second portion in the second area, wherein the first image comprises a cursor operable to overlap the second area, wherein:

each point of the first image in the second area that is not overlapped by the cursor is set to a predetermined image value independent of the combined image, but if the cursor is in the second area, then at least one point overlapped by the cursor in the second area is set to a different image value than the predetermined image value for the point;

receiving a second image signal that carries a second image in at least the second area;

generating the combined image signal for the second area by combining the second portion of the first signal with the second signal.

2. The method of claim 1 wherein for each point of the first and second areas, the combined image at that point is defined by a corresponding value of the combined image signal, and the first image at that point is defined by a corresponding value of the first image signal, and for each point of the second area, the second image at that point is defined by a corresponding value of the second image signal; and for each point of the second area, the corresponding value of the combined image signal is generated as a predetermined function of the corresponding values of the first and second image signals.

3. The method of claim 1 further comprising generating the combined image signal for the first area by selecting the first portion of the first image signal.

4. The method of claim 1 wherein the second image has a first portion in the first area and a second portion in the second area; and the combining operation consists of combining the second portion of the first signal with the second portion of the second signal.

5. The method of claim 4 wherein the first portion of the second image is set to a predetermined image value independent of the combined image; and the method further comprises generating the combined image signal for the first area by combining the first portion of the first image signal with the first portion of the second image signal.

6. The method of claim 5 wherein the predetermined image value for the second image is a value represented by a zero voltage.

7. The method of claim 5 wherein the predetermined image value for the second image is a black color value.

8. The method of claim 1 wherein the combined image signal for the second area is either (1) a voltage sum of the second portion of the first signal and at least a portion of the second signal, or (2) the voltage sum clamped to a predetermined maximum voltage.

9. The method of claim 1 wherein the predetermined image value is a value represented by a zero voltage.

10. The method of claim 1 wherein the predetermined image value is a black color value.

11. The method of claim 1 further comprising generating the first image signal by a computer system, and generating at least a portion of the second image signal by a video camera.

12. The method of claim 11 wherein all of the first image signal other than the cursor is generated by a computer program executed by the computer system.

13. The method of claim 11 wherein the video camera is co-located with the computer system and with a first circuit performing the combining operation, the video camera generates a portion of the second image signal, and another portion of the second image signal is received by the first circuit over a network.

14. The method of claim 1 further comprising generating the first image signal by a computer system co-located with a first circuit performing the combining operation, and receiving at least a portion of the second image signal by the first circuit over a network.

15. An apparatus for generating a combined image signal carrying a combined image occupying at least a first area and a second area, the apparatus comprising:

a computer system operable to generate a first image signal that carries a first image comprising a first portion in the first area and a second portion in the second area, wherein the first image comprises a cursor operable to overlap the second area, wherein each point of the first image in the second area that is not overlapped by the cursor is set to a predetermined image value independent of the combined image, but if the cursor is in the second area, then at least one point overlapped by the cursor in the second area is set to a different image value than the predetermined image value for that point; and a first circuit for generating the combined image signal for the second area by combining the second portion of the first image signal with a second image signal that carries a second image in at least the second area.

16. The apparatus of claim 15 wherein for each point of the first and second areas, the combined image at that point is defined by a corresponding value of the combined image signal, and the first image at that point is defined by a corresponding value of the first image signal, and for each point of the second area, the second image at that point is defined by a corresponding value of the second image signal; and for each point of the second area, the corresponding value of the combined image signal is generated by the first circuit as a predetermined function of the corresponding values of the first and second image signals.

17. The apparatus of claim 16 wherein the first circuit comprises:

a function circuit for receiving the first and second signals and generating a function signal representing said function;

a switch for selecting the first signal or the function signal and providing the combined image signal; and a switch control circuit for controlling the switch to select the function signal when the combining circuit is generating the combined image signal for the second area.

18. The apparatus of claim 17 wherein the function is either (1) a voltage sum of the first and second image signals, or (2) the voltage sum clamped to a predetermined maximum voltage.

19. The apparatus of claim 17 wherein the switch control circuit controls the switch to select the first image signal when the combining circuit is generating the combined image signal for the first area.

20. The apparatus of claim 16 wherein the first circuit comprises a function circuit for receiving the first and second signals and generating a function signal representing said function, the function signal being the combined image signal for the first and second areas.

21. The apparatus of claim 20 wherein the second image has a first portion in the first area and a second portion in the second area;
the first portion of the second signal is set to a predetermined image value independent of the combined image.

22. The apparatus of claim 15 further comprising a video camera for generating at least a portion of the second image signal.

23. The apparatus of claim 22 wherein the computer system comprises a computer program for generating all of the first image signal other than the cursor.

24. The apparatus of claim 23 wherein the video camera is co-located with the computer system and the first circuit, the video camera generates a portion of the second image signal, and the first circuit comprises an input for receiving another portion of the second image over a network.

25. The apparatus of claim 15 wherein the computer system is co-located with the first circuit, and the first circuit comprises an input for receiving at least a portion of the second image signal over a network.

* * * * *